United States Patent [19]

Weickenmeier

[11] 4,134,330

[45] Jan. 16, 1979

[54] METHOD AND APPARATUS FOR STACKING BLANKS

[75] Inventor: Kurt K. Weickenmeier, Reinheim, Germany

[73] Assignee: Koppers Company, Inc., Pittsburgh, Pa.

[21] Appl. No.: 845,627

[22] Filed: Oct. 26, 1977

[51] Int. Cl.² .......................... B31B 1/98; B65B 57/20; B65G 57/02; B65H 33/06

[52] U.S. Cl. .................................. 93/93 M; 93/93 C; 214/6 H

[58] Field of Search ............... 93/93 C, 93 K, 93 DP, 93/93 M; 214/6 N, 6 H

[56] References Cited

U.S. PATENT DOCUMENTS

| | | | |
|---|---|---|---|
| 2,799,212 | 7/1957 | Taylor | 93/93 DP |
| 3,636,828 | 1/1972 | Achelpohl | 93/93 C X |
| 3,759,402 | 9/1973 | Hitch et al. | 214/6 H |
| 3,790,004 | 2/1974 | Tole et al. | 214/6 H |
| 3,938,674 | 2/1976 | Kroeze et al. | 214/6 H X |

*Primary Examiner*—Roy Lake
*Assistant Examiner*—E. F. Desmond
*Attorney, Agent, or Firm*—Thomas L. Sivak; Oscar B. Brumback

[57] ABSTRACT

Disclosed is a method and apparatus for continuously stacking and discharging a predetermined number of flat folded, glued box blanks issuing from a folder-gluer without limiting the operating capacity of the folder-gluer. Provided is a conveyor means for depositing a predetermined number of blanks on a stacking table. Interposed between the conveyor and table are counter means and blank deflecting means. After a predetermined number of blanks have been counted, the counter activates the deflecting means and a secondary support means. The next following blank is deflected and engaged by a secondary support means and it and the following blanks are supported thereby until the blanks on the support table have been discharged and the table assumes the support of the new stack.

8 Claims, 3 Drawing Figures

Fig. I.

METHOD AND APPARATUS FOR STACKING BLANKS

BACKGROUND OF THE INVENTION

1. Field of Invention

This invention relates generally to the art of box making from corrugated paperboard. More particularly, it relates to a method and apparatus for continuously stacking a predetermined number of flat folded, glued box blanks issuing from a folder-gluer.

2. Description of the Prior Art

Various methods and apparatus have been used to stack box blanks issuing from a folder-gluer. Such a prior art device is shown and described in U.S. Pat. No. 3,892,168. In these prior art devices, once a stack has been counted and is being discharged from the stacking table, the following blanks must necessarily be accumulated at some point to be released, when the stacking table is ready to accept them. One drawback of these devices is the length of the operating cycle of the accumulating device. With the speed of the present conveyors which carry blanks from the folder-gluer, even an operating cycle of five seconds for the accumulating device can limit the number of blanks which can be accurately stacked to quantities of twenty-five or more.

The present invention overcomes the foregoing problems of the prior art by providing a method and apparatus which greatly reduces the operating cycle of the accumulating device and thereby permits the formation of accurately counted stacks of even a minimum number of blanks.

SUMMARY OF THE INVENTION

The present invention provides a conveyor means for receiving the flat folded, glued box blanks from a folder-gluer. The blanks are maintained in their folded condition by means of a pressure device suspended above the moving belt of the conveyor. Downstream of the folder-gluer on the conveyor is mounted an automatic counter adapted to count and register the number of blanks passing it. The counter means is operably connected to activate the blank deflecting means and the secondary support means which are located downstream of the counter.

At the end of the conveyor is a blank stacking table which receives the blanks from the conveyor. Mounted immediately behind the stacking table is a stop plate which retards the flow of the blanks and serves to align them. Forward of the stacking table is a pivotally mounted plate which also serves to urge the blanks into alignment against the back plate. Adjustable side guides are also provided to maintain lateral alignment.

Operably mounted above the stacking table is a driven pressure member. The pressure member maintains the folded condition of the blanks while they are on the stacking table and also urges them against the stop plate. The driven pressure member also maintains the blanks in contact with the stop plate while they are being accumulated on the secondary support means. The stacking table is adapted to move downward with respect to the conveyor as the number of blanks accumulated thereon increase. At the lowermost end of the path of travel of the table is a transfer table. When the predetermined number of blanks are accumulated on the stacking table, they are discharged onto the transfer table by a pusher. The stack of blanks is then carried by the transfer table to a bundler for wrapping.

The secondary support means is provided for the following blanks which must be accumulated while the first stack is being discharged. The secondary support means is comprised of two endless belts mounted on supports at each end of the transfer table. Each belt carries a series of stop members which are adapted to engage the blanks when the secondary support means is made operable by the counter means. The secondary support means is adapted to immediately engage the first blank which is laterally deflected from its path of travel by the deflector means. This immediate engagement overcomes any delay in accumulating the blanks while the blanks on the support table are being discharged and eliminates the possibility that due to a delay in the operation of the secondary support an improper number of blanks would be discharged to the support table. After deflecting the first blank, the deflector returns to its original position and the following blanks are supported by the first blank which is supported by the secondary support means. The deflection of the first blank permits it to be engaged by the stop members of the secondary support in a position where it is free and clear of the blanks on the support table. The stop members are mounted on the belt member of the secondary support means so that each series of stops is followed by an equal length of belt without stops. This arrangement permits the landing of blanks on the support table without interference from the secondary support means and the immediate engagement of the first blank after the predetermined number of blanks has been stacked on the stacking table.

When the blanks have been discharged from the stacking table by the pusher means, the stacking table returns toward its uppermost position and assumes support of the blanks accumulated on the secondary support means. The belts of the secondary support run until the first stop is in position to accept the next deflected blank. After a predetermined number of blanks are stacked on the stacking table, the counter activates the secondary support means and the cycle is repeated. The present invention permits the formation of precounted stacks of blanks of a minimum number without interfering with the continuous operation of the folder-gluer.

DESCRIPTION OF THE PREFERRED EMBODIMENT

Figure 1:
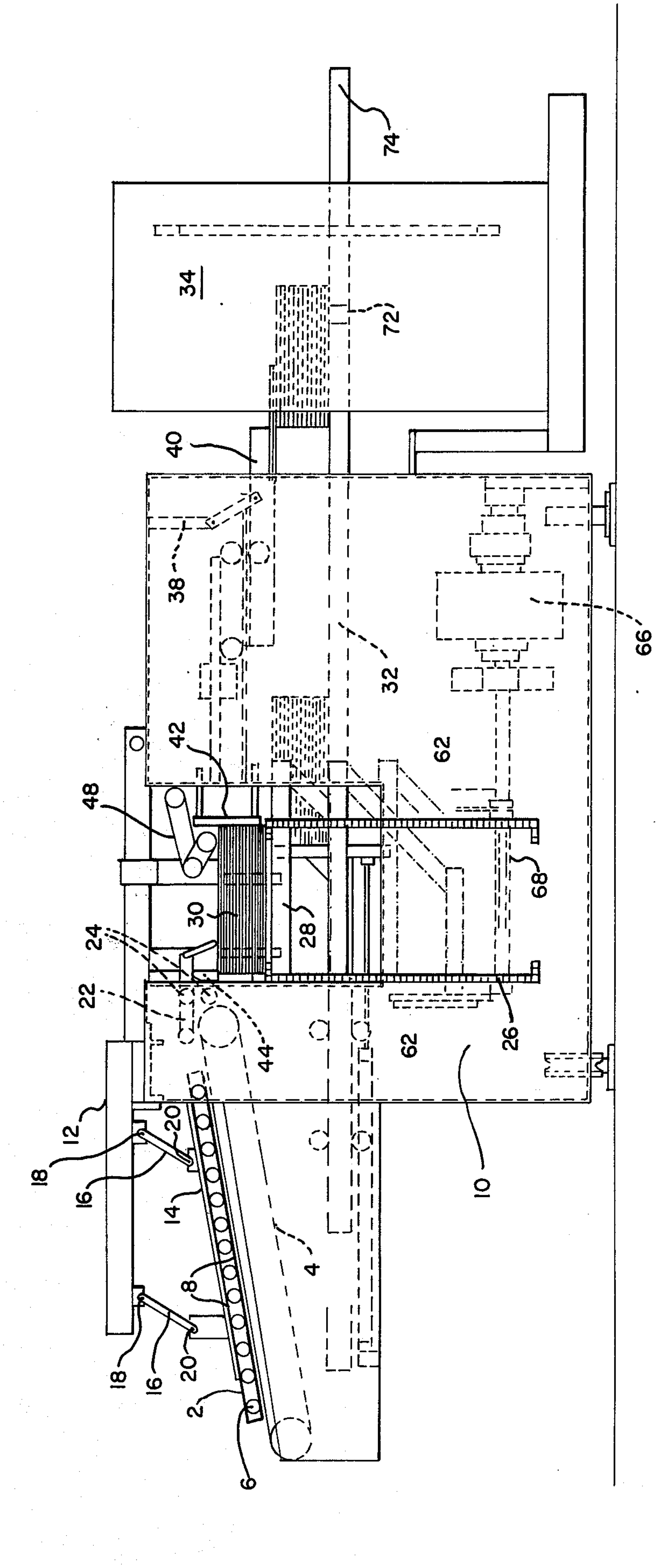
FIG. 1 is a side view in elevation of the stacking apparatus of the present invention.
Figure 2:
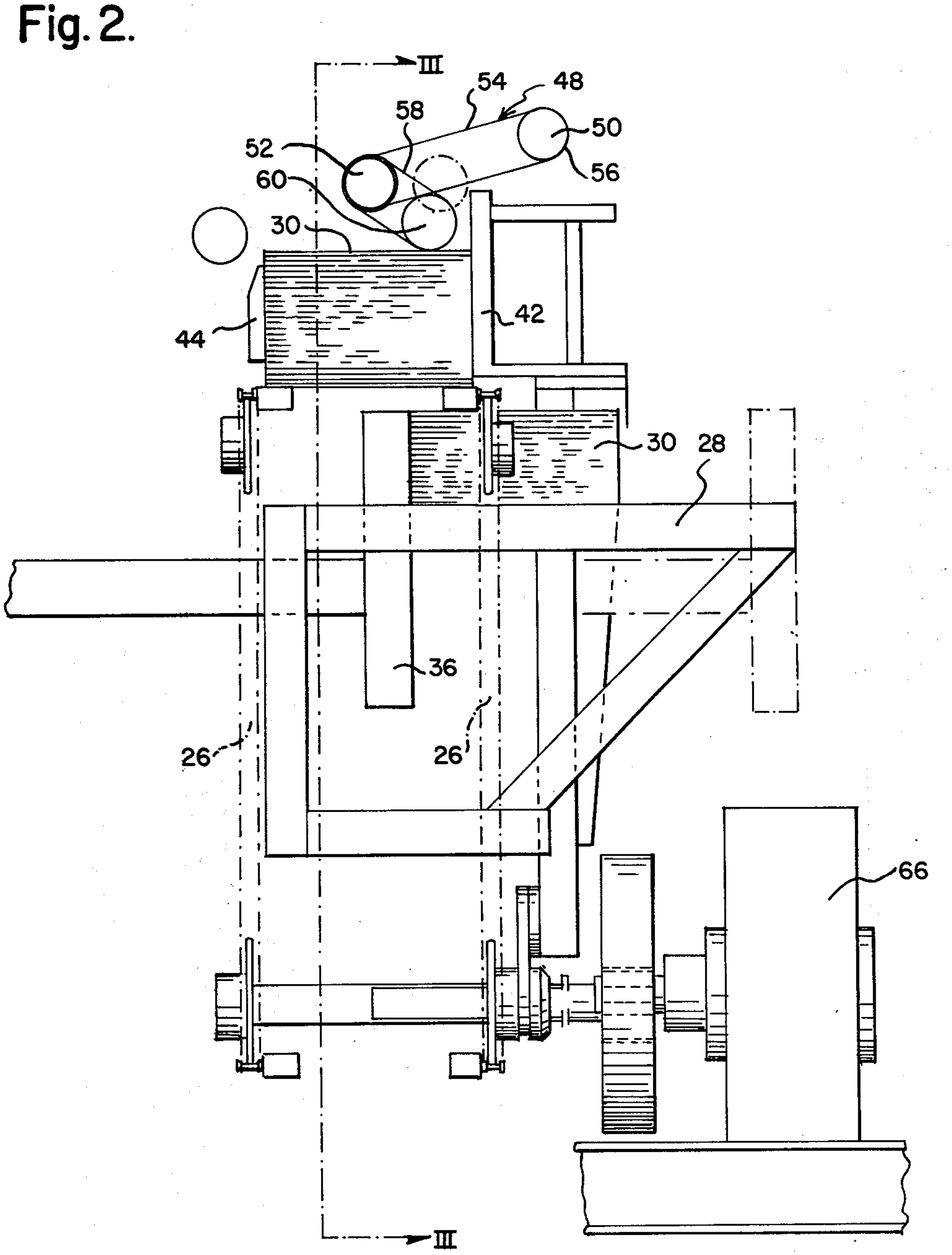
FIG. 2 is a view of the support table section of the apparatus of the present invention.

Referring to FIG. 1 the flat folded, glued blanks are taken from a folder-gluer, not shown, onto a conveyor 2. The blanks are moved on conveyor 2 by means of a driven belt 4, over idler rolls 6, which are rotatably mounted between plates 8 of conveyor 2. Belt 4 is driven by a motor in a conventional manner well known and understood in the conveyor art. Suspended from frame 10 by means of mount 12 is a pressure plate 14. Plate 14 is connected to plate 12 by arms 16. Arms 16 are pivotally connected to mount 12 and plate 14 by pins 18 and 20. The blanks conveyed by conveyor 2 pass beneath plate 14 which, in cooperation with belt 4, maintain the blanks in their flat folded condition.

The blanks traveling over conveyor 2 are counted by an electronic counter-register 22. Counter-register 22 is a commercially available unit which is also adapted by conventional circuitry to activate and reset blank deflecting rolls 24 and the secondary blank support mechanism 26. The blank deflecting rolls 24 are mounted to frame 10 by conventional means and are adapted when activated by the counter-register to laterally deflect a blank from its line of travel. The deflection is accomplished by a lateral movement of rolls 24. Rolls 24 are moved laterally by means of an electromagnet, not shown, which attracts the rolls upon signal from the counter-register. Rolls 24 are motor driven in a conventional manner and when moved laterally they engage the blank and cause it to shift laterally. Immediately after the deflected blank passes through rolls 24, the rolls return to their original position by means of a reset signal provided by the counter-register circuit.

Located downstream of the rolls 24 is a stacking table 28 which is adapted to be moveable upwardly and downwardly by means of a conventional piston arrangement, not shown. Stacking table 28 moves downwardly as the number of blanks 30 thereon increases. When table 28 reaches its lowermost position, it is in operable relationship with transfer table 32, which is adapted to carry the blanks to a bundler 34 where the stack of blanks is wrapped. The stack of blanks is ejected from stacking table 28 onto transfer table 32 by means of a conventional hydraulic ram 36. Mounted from frame 10, through adjustable arms 38, is guide bar 40. Bar 40, which extends parallel to table 32, maintains the blanks in alignment and in their flat folded condition. Arms 38 are telescopic to permit adjustment of their length and a corresponding adjustment in the height of guide bar 40.

Figure 3:
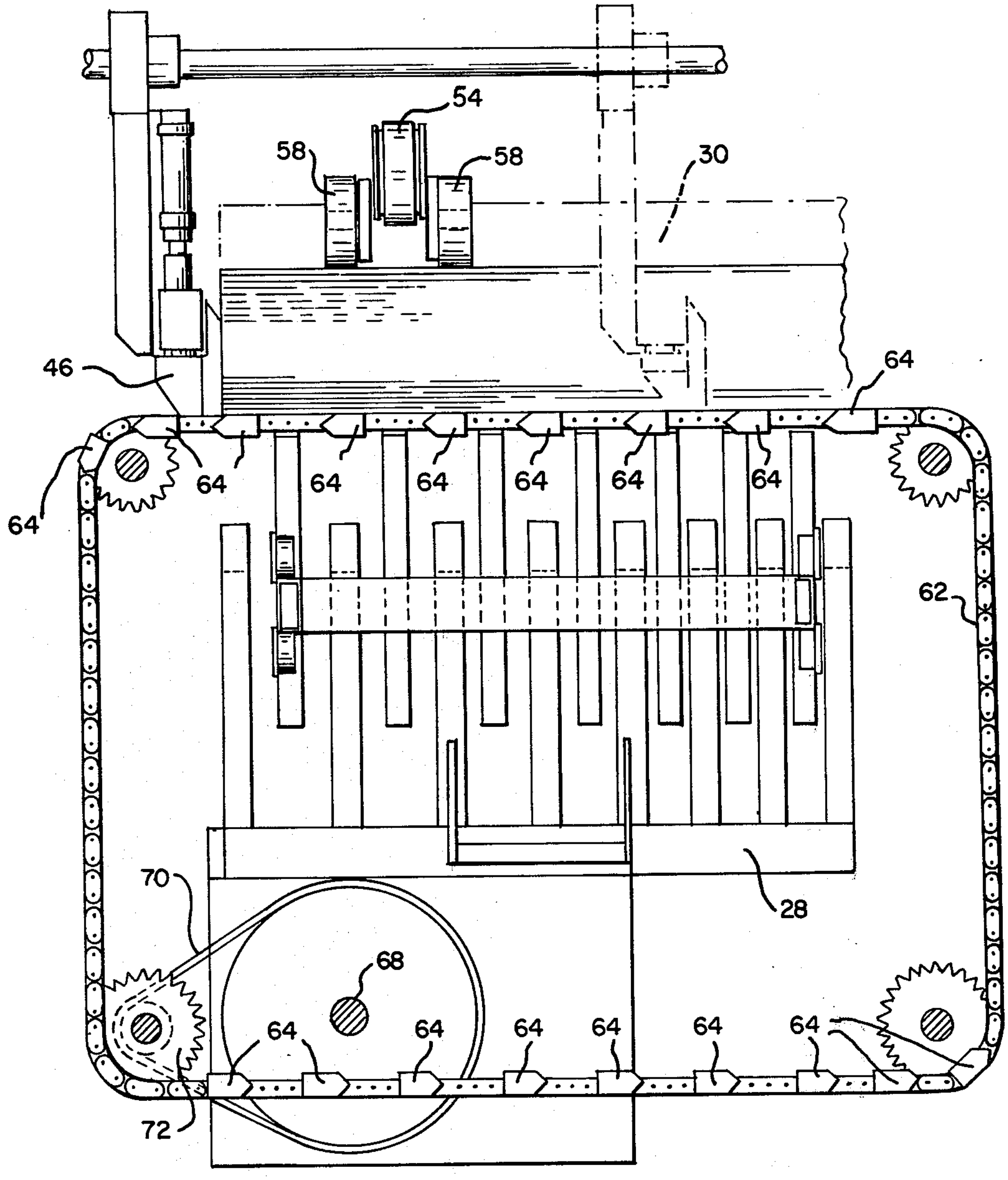
FIG. 3 is an elevational view taken along line III—III of FIG. 2.

Mounted to frame 10 rearward of stacking table 28 is stop plate 42. Forward of table 28 mounted pivotally to frame 10 is plate 44. Plate 44 is biased so as to urge the blank toward stop plate 42. Adjustable side guides 46, FIG. 3, are also provided. Fixed to frame 10 is driven pressure member 48. Pressure member 48 is pivoted on pin 50, and consists of a driven roll 52, belt 54, shaft 56, belt 58 and pressure roll 60. Pressure roll 60, being driven by means of roll 52 and belt 58, urges the blanks toward stop plate 42.

The secondary support means consists of endless belt members 62 having fastened thereto by conventional means a series of stops 64. The belts can be endless chains synchronously driven by motor 66 through drive shaft 68, belt drive 70 and gear 72. Motor 66 is activated by the counter-register 22 and deactivated by a reset signal from the counter-register circuit. As shown in FIG. 3, the stops 64 are arranged so that a series of stops is followed by an equal length of chain having no stops. This arrangement permits the leading stop of a series to immediately contact the deflected blank while allowing blanks to be placed on the stacking table when the secondary support means is not operable.

In operation, flat folded, glued paperboard blanks are conveyed over conveyor 2 past the counter-register 22 and deposited on the stacking table 28. The blanks are kept in alignment by stop plate 42, pivotable plate 44 and pressure member 48. As the number of blanks increases on stacking table 28, it moved downward toward transfer table 32. When the last of a predetermined number of blanks has accumulated on table 28, the counter-register activates blank deflector 24 which laterally deflects the next blank, to the right as viewed in FIG. 3. The secondary support means is also activated so as the first stops 64 in the series engage the edge of the deflected blank. The stops then support the blank in concert with plates 42 and 44, edge guides 46 and pressure members 48. Edge guides prevent the blank from being carried away by the stops. By this positioning of the blanks, all the following blanks are now supported on the first blank until table 28 returns to position to assume support of the blanks. Table 28 is at its lowermost position and the stack of blanks thereon is discharged to transfer table 32 by means of ram 36. As table 28 is returning to its upper position, deflecting means 28 have been deactivated and the following blanks are supported on the first blank on stops 64. When table 28 reaches its uppermost position, it assumes support of the blanks from stops 64 and the secondary support means is stopped by a reset signal so that the first stop 64 is in position to engage the next blank caused to be deflected. While the seondary support means is in its inoperative position, there are no stops in the path of the blanks from conveyor 2 to support table 28. The blanks continue to accumulate on table 28 until a preset number is reached and the cycle is then repeated.

The blanks ejected to transfer table 32 are conveyed to a conventional bundler 34 for wrapping. In an alternate embodiment of the invention, transfer table 32 is made adjustable in length so a gap 74 exists in bundler 34 upstream of platform 36. By varying the length of transfer table 32, the location of the gap can be set so bundler 34 can be shifted in the gap to wrap the blanks in the center of the stack.

While I described certain preferred embodiments of my invention, it will be understood the invention may otherwise be embodied within the scope of the following claims.

What is claimed:

1. A method of stacking a predetermined number of flat folded, glued box blanks comprising the steps of:
   (a) moving said blanks on a conveyor means in their folded condition past a counter-register to a support table,
   (b) counting said blanks as they pass said counter-register,
   (c) deflecting the next following blank laterally after a predetermined number of blanks have been counted and accumulated on said stacking table, and
   (d) supporting said deflected blank by secondary support means while said predetermined number of blanks are being ejected from said stacking table.

2. The method of claim 1 wherein said support table supports the deflected blank and all following blanks after the predetermined number of blanks have been ejected therefrom.

3. An apparatus for stacking a predetermined number of flat folded, glued box blanks received from a folder-gluer comprising:
   (a) a first conveyor means for receiving said blanks, said first conveyor having means for maintaining said blanks in said flat folded condition while said blanks are traveling on said conveyor,
   (b) counter-register means for counting the number of blanks on said conveyor,
   (c) first support means adapted to receive said blanks from said conveyor, said first support means adapted to move downward with respect to said conveyor as the number of blanks thereon increases and return to its uppermost position when the blanks are removed therefrom, (d) blank deflector means located downstream of said counter-register on said first conveyor and upstream of said first support means, said deflector means adapted to deflect a blank laterally from its line of travel on said first conveyor on a signal from said counter-register, (e) secondary support means adapted to receive and support said deflected blank in response to a signal from said counter-register, and (f) secondary conveyor means adapted to receive a stack of blanks from said first support means when said first support means is in its lowermost position, second conveyor means adapted to transport said blanks to a wrapping station.

4. The apparatus of claim 3 wherein said secondary support means comprises a plurality of synchronously driven belt means having a series of stop means mounted on said belt means, said stop means adapted to engage and support said deflected blank.

5. The apparatus of claim 4 wherein the length of a series of said stops corresponds to the length of the width of the blanks supported thereon and said series of stops alternate with an open space on said belt equal to the length of the series of stops.

6. The apparatus of claim 5 wherein said blank deflector means comprises a plurality of driven rollers adapted to engage a preselected blank on signal from said counter-register and move with said blank laterally from the direction of travel from said blank, said rollers adapted to return to their first position when said blank has passed through in response to a reset signal from said counter-register.

7. The apparatus of claim 6 wherein stop means are mounted rearward of said first support means and moveable pressure means are mounted above said support, said moveable pressure means adapted to urge said blanks toward said support while moving said blanks toward said stop means.

8. The apparatus of claim 7 wherein said second conveyor means is adjustable in length for providing a plurality of locations in said wrapping station to which said bundles of blanks are delivered.

* * * * *